United States Patent [19]

Kasugai et al.

[11] Patent Number: 4,944,425
[45] Date of Patent: Jul. 31, 1990

[54] FUEL CAP

[75] Inventors: Joji Kasugai, Ichinomiya; Satoshi Toki, Inazawa; Norikazu Hosokawa, Aichi, all of Japan

[73] Assignee: Toyoda Gosei Co., Ltd., Nishikasugai, Japan

[21] Appl. No.: 235,446

[22] Filed: Aug. 23, 1988

[30] Foreign Application Priority Data

Oct. 24, 1987 [JP] Japan .................... 62-269049

[51] Int. Cl.⁵ .............................. B65D 51/16
[52] U.S. Cl. ..................... 220/203; 220/208; 220/209; 215/271; 215/315
[58] Field of Search ............ 220/203, 208, 209; 215/260, 261, 262, 270, 271, 315

[56] References Cited

U.S. PATENT DOCUMENTS

| | | | |
|---|---|---|---|
| 2,133,575 | 10/1938 | Rosenberg | 220/208 X |
| 3,338,457 | 8/1967 | Tygenhof | 220/208 X |
| 3,820,680 | 6/1974 | Friend | 220/203 |
| 4,051,975 | 10/1977 | Ohgida et al. | 220/203 |
| 4,185,751 | 1/1980 | Moore et al. | 220/203 |
| 4,540,103 | 9/1985 | Kasugai et al. | 220/203 |
| 4,572,396 | 2/1986 | Kasugai et al. | 220/203 |
| 4,588,102 | 5/1986 | Kasugai | 220/203 |
| 4,666,056 | 5/1987 | Kasugai et al. | 220/203 |
| 4,724,868 | 2/1988 | Kasugai et al. | 137/516.29 |
| 4,726,488 | 2/1988 | Kasugai | 220/203 |
| 4,785,961 | 11/1988 | Kasugai et al. | 220/203 |

FOREIGN PATENT DOCUMENTS

| | | |
|---|---|---|
| 2214124 | 3/1973 | Fed. Rep. of Germany ...... 220/209 |
| 2357803 | 11/1983 | Fed. Rep. of Germany . |
| 1107729 | 3/1968 | United Kingdom . |

Primary Examiner—Stephen Marcus
Assistant Examiner—Christine A. Peterson
Attorney, Agent, or Firm—Cushman, Darby & Cushman

[57] ABSTRACT

A fuel cap where a valve body held to a valve support plate for performing pressure adjustment is arranged in a cap body installed to a filler neck of a fuel tank, and the part number can be decreased. The valve body has an outer circumferential lip element which is projected from an outer circumferential edge and pressed against an annular projection projecting inward in a fluid flow path of the cap body, and an inner circumferential lip element which is projected from an inner circumferential edge in reverse direction to the outer circumferential lip element. The valve support plate supports the valve body from rear side of the outer circumferential lip element, and has a seal member against which the inner circumferential lip element is pressed from the support position to inner circumferential side. Biasing means for pressing the outer circumferential lip element of the valve body is connected to the valve support plate. At the outside of the seal member in the valve body or the valve support plate, a communication hole which performs communication of the atmosphere side with the fluid flow path of the cap body is formed when the inner lip element is separated from the seal member.

3 Claims, 6 Drawing Sheets

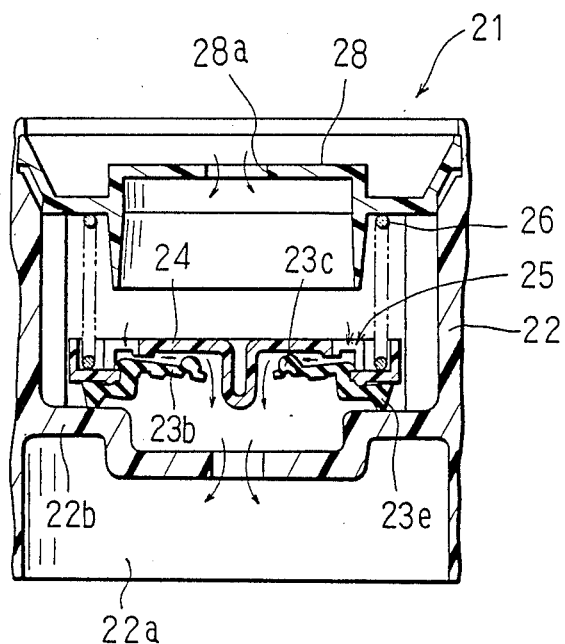
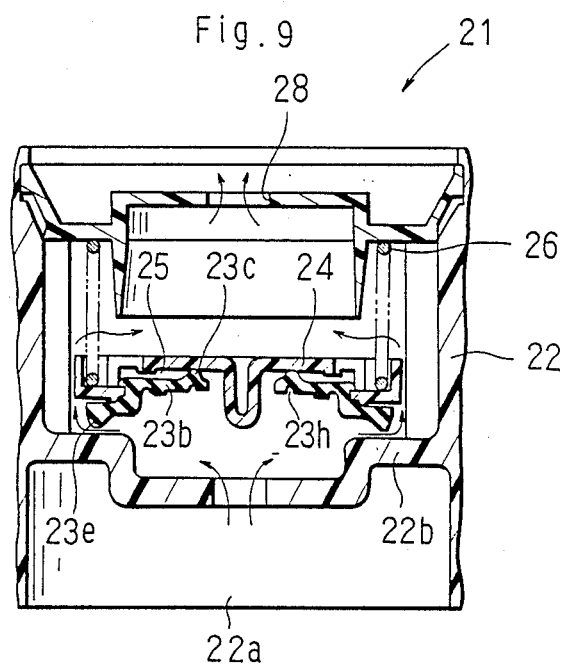

FUEL CAP

BACKGROUND OF THE INVENTION

The present invention relates to a fuel cap which is installed to a filler neck of a fuel tank for automobiles and adjusts pressure in the fuel tank by flowing fluid such as air out of the fuel tank or into the fuel tank from outside when the pressure in the fuel tank is positive or negative.

In the prior art, such fuel cap (hereinafter referred to simply as "cap") is disclosed in an example as shown in FIG. 1 (refer to Japanese Utility Model Laid-open Publication No. Sho 60-179654).

In the cap 11, at normal state, an outer circumferential lip element 13b is biased downward through an annular support plate 14 by a first coil spring (first biasing means) 16 and pressed against an annular projection 12b of a cap body 12, and an inner circumferential lip element 13a is biased upward by a second coil spring (second biasing means) 17 and pressed against a disk-shaped valve plate 18 and closes a fluid flow path 12a of the cap body 12. When pressure in the fuel tank becomes positive pressure of a prescribed valve or more, the outer circumferential lip element 13b is elevated together with the support plate 14 against biasing force of the first coil spring 16 and separated from the annular projection 12b of the cap body 12 so that the positive pressure state within the fuel tank is eliminated through the gap. Also when pressure in the fuel tank becomes negative pressure of a prescribed valve or more, the valve plate 18 is moved downward against the biasing force of the second coil spring 17 and separated from the inner circumferential lip element 13a so that the negative pressure state within the fuel tank is eliminated through the gap. Numeral 10 designates a filler neck.

In the cap 11, however, at normal state, since the fluid flow path 12a of the cap body 12 is closed by the first coil spring 16 biasing the outer circumferential lip element 13b downward and the second coil spring 17 biasing the inner circumferential lip element 13a upward, the two coil springs 16, 17 and the valve plate 18 are indispensable.

SUMMARY OF THE INVENTION

An object of the invention is to provide a fuel cap wherein even if means for biasing an inner circumferential lip element and a valve plate are not installed, a fluid flow path can be closed at normal state and pressure can be adjusted at pressure varying state, and the part number and the assembling process number are small, and further the manufacture is possible at low cost.

The foregoing object can be attained by a fuel cap which is installed to a filler neck of a fuel tank, comprising: a cap body provided with a fluid flow path, and an annular projection projecting inward at an inner circunference of the fluid flow path; an annular valve body of a rubber state elastic material provided with an outer circumferential lip element projected from an outer circumferential edge and pressed against the annular projection, and an inner circumferential lip element projected from an inner circumferential edge in reverse direction to the outer circumferential lip element; a disk-shaped valve support plate provided with a support portion disposed at rear side of the outer circumferential lip element for supporting the valve body, and a seal member for pressing the inner circumferential lip element at the inside from the support portion when the valve body is supported; a communication hole provided at the outside of the seal member in the valve body or the valve support plate for performing communication of the atmosphere side with the fluid flow path when the inner circumferential lip element is separated from the seal member; and means for biasing the valve support plate in such direction that the outer circumferential lip element of the valve body is pressed against the annular projection.

In the fuel cap according to the invention, after it is installed to the filler neck, at normal state, the outer circumferential lip element of the valve body is pressed against the annular projection of the cap body by the spring biasing means and the inner circumferential lip element of the valve body is pressed against the seal member of the valve support plate by elasticity of the valve body, and the fluid flow path within the cap body is closed by the valve body and the valve support plate.

When the pressure within the fuel tank becomes negative pressure or positive pressure of a prescribed valve or more, the inner circumferential lip element of the valve body is bent against the elasticity of the vlave body in direction separating from the seal member of the valve support plate thereby a gap is produced between the inner circumferential lip element and the valve support plate. Consequently, the closing of the fluid flow path of the cap body is released by the gap, and the negative pressure state or the positive pressure state within the fuel tank is eliminated.

In other words, even if means for pressing the inner circumferential lip element against the seal member and the valve plate as in the prior art are not installed, when the pressure within the tank is varied, the inner circumferential lip element is bent against the elasticity of the valve body in direction separating from the valve support plate, thereby the pressure variation within the fuel tank can be eliminated.

Consequently, the biasing means to the inner circumferential lip element and the valve plate become unnecessary, and corresponding to this the part number and the assembling process number are reduced in comparison to the prior art, thereby the manufacturing cost can be reduced and the fuel cap can be manufactured at low charge.

BRIEF DESCRIPTION OF THE DRAWINGS

FIG. 8 is a partial sectional view illustrating operation state at negative pressure state in the embodiment;

FIG. 9 is a partial sectional view illustrating operation state at positive pressure state in the embodiment;

DESCRIPTION OF THE PREFERRED EMBODIMENTS

Figure 1:
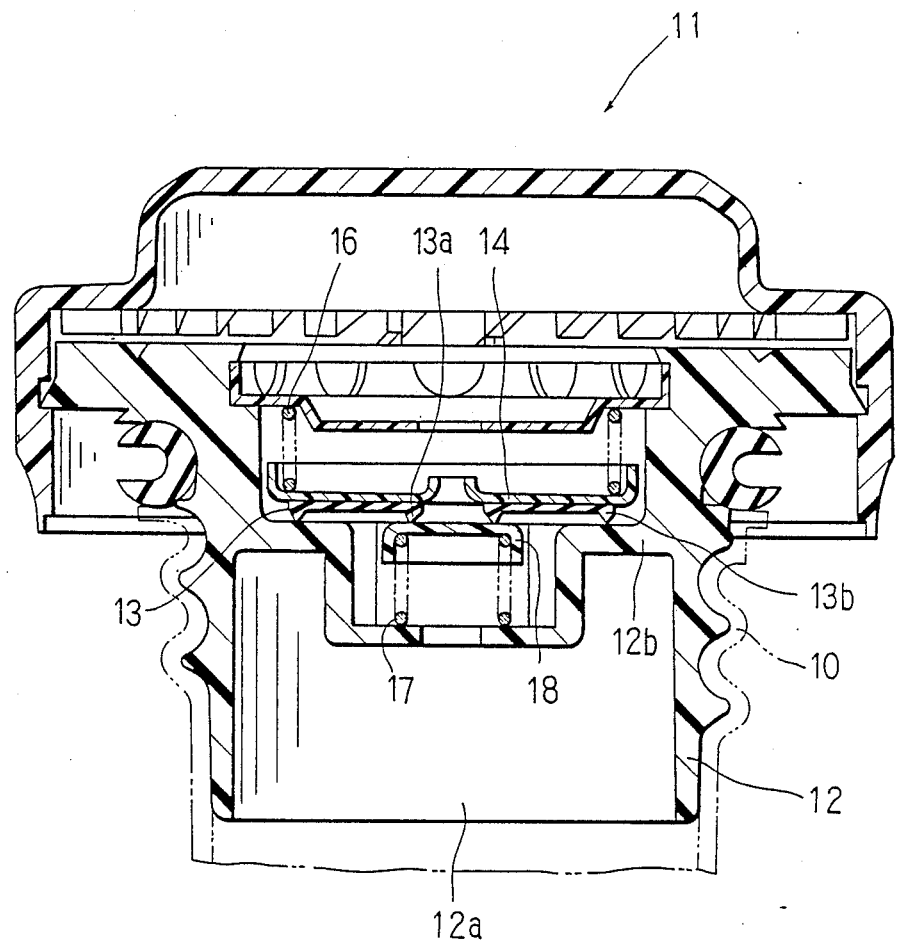
FIG. 1 is a sectional view of a fuel cap in the prior art.
Figure 2:
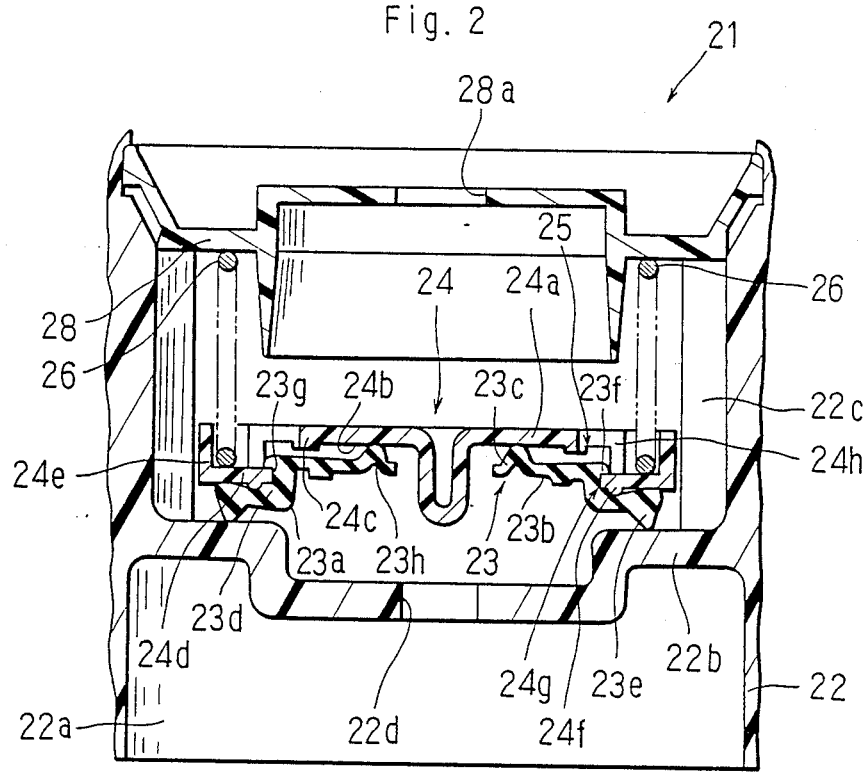
FIG. 2 is an enlarged sectional view of a fuel cap as a first embodiment of the invention.
Figure 3:
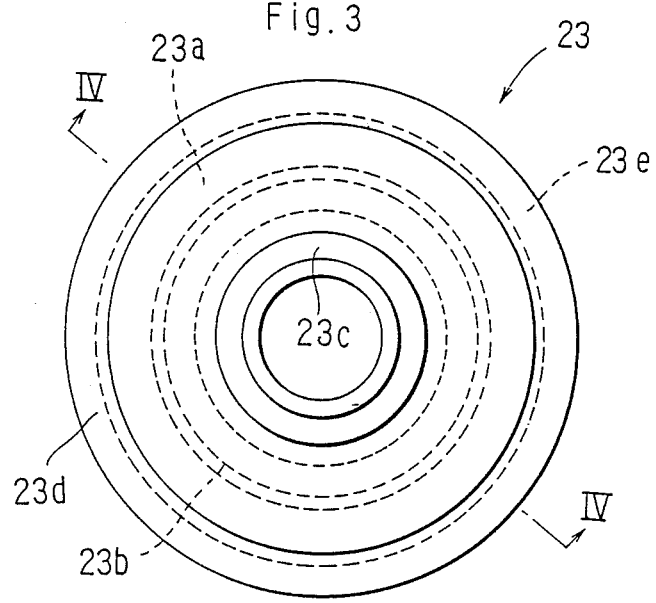
FIG. 3 is a plan view of a valve body to be used in the embodiment.
Figure 4:
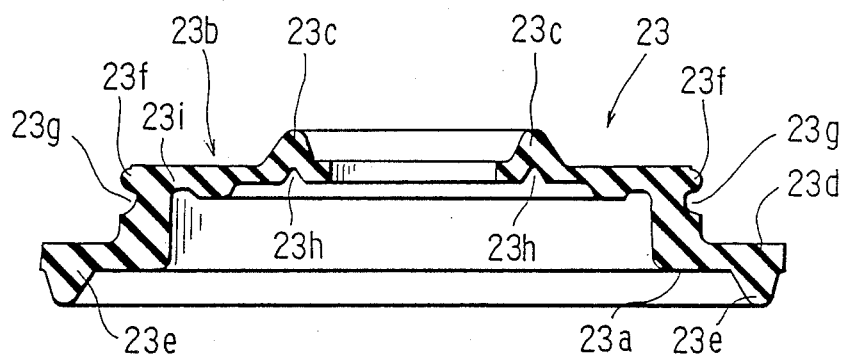
FIG. 4 is a sectional view in line IV—IV of FIG. 3.
Figure 10:
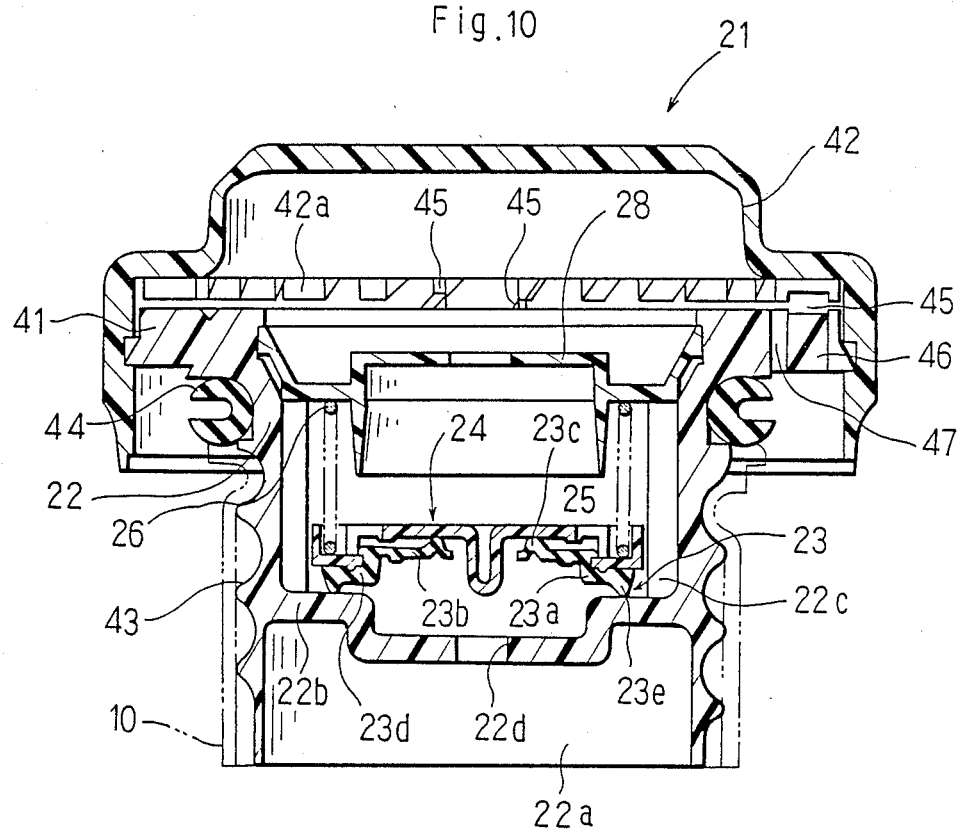
FIG. 10 is a sectional view of the embodiment.
Figure 5:
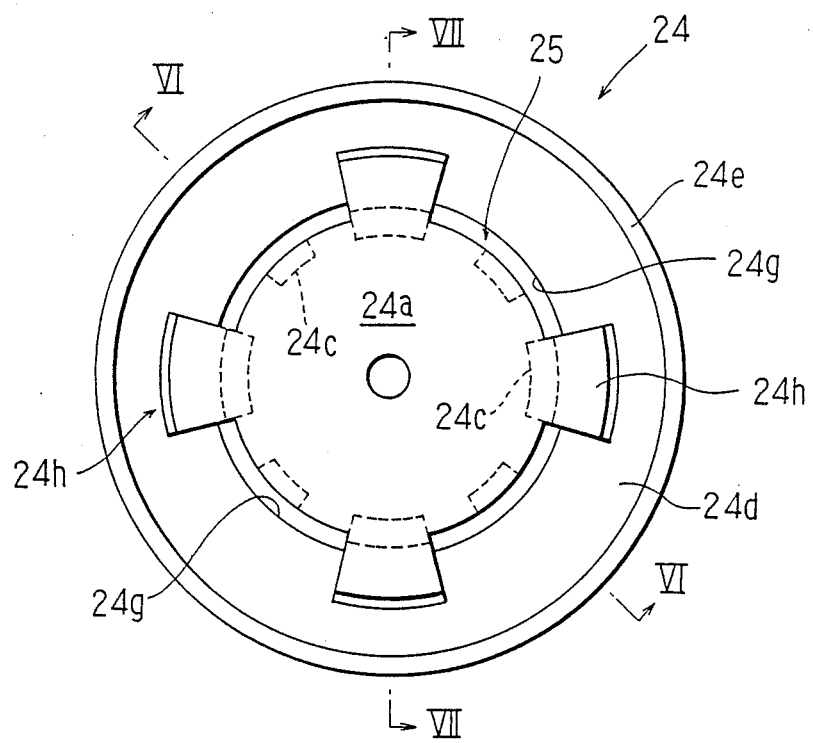
FIG. 5 is a plan view of a valve support plate to be used in the embodiment.
Figure 6:
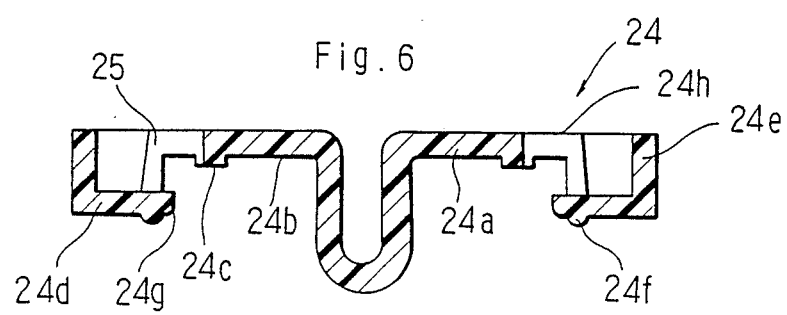
FIG. 6 is a sectional view taken in line VI—VI of FIG. 5.
Figure 7:
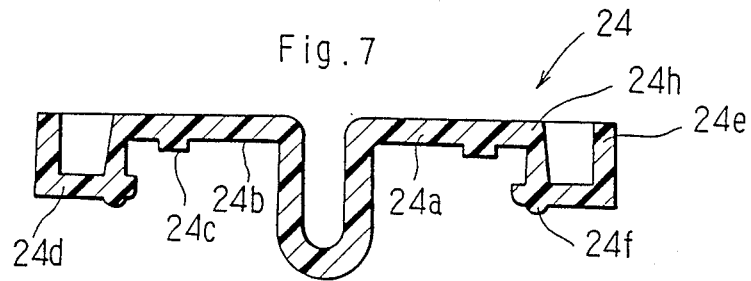
FIG. 7 is a sectional view taken in line VII—VII of FIG. 5.

Embodiments of the invention will now be described referring to the accompanying drawings.

A fuel cap 21 of a first embodiment shown in FIGS. 2~10 is composed of a cylindrical cap body 22 of plastics such as polyacetal, and a disk-shaped upper cover 42 of plastics such as nylon to be fitted to a flange portion 41 partially provided on upper end of the cap body 22. In order to prevent over-tightening of the cap 21 of the filler neck 10, as known in the prior art, a ratchet projection 42a is formed at lower surface of the upper cover 42, and an elastic finger 46 provided at its top end with a locking powl 45 engageable with the ratchet projection on 42a is formed on the flange portion 41 of the cap body 22 and projected in the circmferential direction. A gap 47 formed in the circumferential direction to each flange portion 41 constructs a part of a fluid flow path 22a of the cap body 22 which communicates with air as hereinafter described.

A thread 43 for installing to the filler neck 10 is provided on the outer circumference of the cap body 22, and a seal ring 44 is installed outward to the lower surface of the flange portion 41.

The flow path 22a for fluid such as air in the tank is formed within the cap body 22, and an annular projection 22b projecting inward in radial direction is formed on the inner circumference of the fluid flow path 22a. Numeral 22c designates a plurality of ribs installed on the inner circumference of the fluid flow path 22a in order to guide movement in a valve support plate 24 at positive pressure operation state, and numeral 22d designates a fluid flowing hole.

Also in the fluid flow path 22a a valve body 23, a valve support plate 24, a coil spring 26 and a spring shoe plate 28 are arranged.

The valve body 23 is an annular body made of rubber or rubber-like elastic material such as thermoplastic elastomer, and composed of a base portion 23a, an inside arm member 23b extending inward from an upper edge of the base member 23a, and an outside arm portion 23d extending outward from a lower edge of the base member 23a. An inner circumferential lip element 23c projecting upward is formed at the top end of the inside arm member 23b, i.e., at the inner circumferential edge of the valve body 23, and an outer circumferential lip element 23e projecting downward is formed at the top end of the outside arm member 23d, i.e., at the outer circmferential edge of the valve body 23. A thin portion 23i is formed at a joint portion of the inside arm member 23b with the base member 23a. On upper side of the outer circumference of the base member 23a, an annular projection 23f and an annular recess 23g continuing to lower side of the annular projection 23f are formed and engageable with a valve support plate 24 as hereinafter described.

Outer diameter of the outer circumferential lip element 23e is specified so that the outer circumferential lip element 23e can be pressed against upper surface of the annular projection 22b of the cap body 22. Also inner diameter of the inner circumferential lip element 23c has dimension so that when the outer circumferential lip element 23e is pressed against the upper surface of the annular projection 22b, the inner circumferential lip element 23c is positioned inside the annular projection 22b.

An annular thickness reducing portion 23h is formed at the lower side of the inner circumferential lip element 23c so that the filling pressure at the position of the inner circumferential lip element 23c is not rapidly varied during the injection molding.

The valve support plate 24 is a disk-shaped body made of plastics such as polyacetal, and a disk-shaped inside plate 24a and an annular outside plate 24d are partially connected by a connecting element 24h having L-like cross-section so that a prescribed gap between upper and lower sides is formed. The gap between the inside plate 24a and the outside plate 24d becomes a communiccation hole 25.

A projection 24c is partially provided on circumferential edge at the lower surface of the inside plate 24a. The projection 24c prevents deterioration of seal property caused by that the inside arm portion 23b of the valve body 23 is moved upward beyond a prescribed range and abutting state of the inner circumferential lip element 23c on the seal portion 24b is deteriorated. Center portion of the inside plate 24a is projected downward in cylindrical form.

An annular projection 24f is projected on the lower surface at the inner circumferential edge of the outside plate 24d, and an annular rib 24e is projected upward on the upper surface at the outer circumferential edge thereof so as to guide a coil spring 26 as hereinafter described.

An inner circumferential edge 24g of the outside plate is engaged with the annular recess 23g of the valve body 23 so that the valve body 23 is supported. In other words, the inner circumferential edge 24g of the outside plate becomes the support position of the valve body 23. When the valve body 23 is assembled with the valve support plate 24, the inner circumferential lip element 23c of the valve body 23 is bent a little (about 0.5 mm) downward and pressed against the seal portion 24b.

The spring shoe plate 28 is provided at the center with a fluid flowing hole 28a and made of plastics such as polyacetal, and is arrange in the fluid flow path 22a of the cap body 22 on the upper side of the valve support plate 24 and holds the upper end of the coil spring (biasing means) 26 for biasing the valve support plate 24 downward.

The coil spring 26 biases the valve support plate 24 downward, and presses the outer circumferential lip element 23e of the valve body 23 against the annular projection 22b of the cap body 22. Assembling of each of these members to the top cap body 22 will be described.

First, the annular recess 23g of the valve body 23 is engaged with the inner circumferential edge 24g of the valve support plate 24, thereby the valve body 23 is held to the valve support plate 24. The valve body 23 and the valve support plate 24 are arranged within the cap body fluid flow path 22a so that the outer circumferential lip element 23e is arranged on the upper surface of the annular projection 22b. And then the coil spring 26 is arranged on the upper surface of the valve support plate 24, and the spring shoe plate 28 is arranged from upper side of the coil spring 26 into the cap body fluid flow path 22a.

Further the seal ring 44, the upper cover 42 and the like are assembled thereby the cap 21 of the embodiment can be constructed.

After the cap 21 is installed to the filler neck 10, at normal state, the outer circumferential lip element 23e of the valve body 23 is pressed against the upper surface of the annular projection 22b of the cap body 22 by the coil spring 26 through the valve support plate 24. Also the inner circumferential lip element 23c of the valve body 23 is pressed against the seal member 24b of the valve support plate 24 by elasticity of the valve body 23 itself. Consequently, the fluid flow path 22a on the lower side of the annular projection 22b is closed by the valve body 23 and the valve support plate 24.

When pressure within the tank becomes negative pressure of prescribed valve or more, as shown in FIG. 8, the inside arm position 23b of the valve body 23 is bent downward about the base portion and the inner circumferential lip element 23c is separated from the seal member 24b, thereby a gap is produced between the inner circumferential lip element 23c and the seal surface 24b. Consequently, air flows from outside of the cap 21 through the fluid flowing hole 28a of the spring shoe plate 28 and the communication hole 25 of the valve support plate 24 into the tank, thereby the negative pressure state within the tank is eliminated.

Also when the pressure within the tank becomes positive pressure of prescribed valve or more, as shown in FIG. 9, the outer circumferential lip element 23e is elevated together with the valave support plate 24 against the biasing force of the coil spring 26, and separated from the upper surface of the annular projection 22b of the cap body 22. Consequently, the closed state of the fluid flow path 22a of the cap body 22 is released by a gap formed between the outer circumferential lip element 23e and the annular projection 22b and fluid such as air flows out of the tank, thereby the positive pressure state within the tank is eliminated.

In the cap body 21, even if the coil spring or the valve plate as biasing means to the inner circumferential lip element 23c as in the prior art is not installed, at normal state, the inner circumferential lip element 23c is pressed against the seal member 24b of the valve support plate 24 by elasticity of the valve body 23 and closes the fluid flow path 22a. When pressure within the tank becomes negative pressure of prescribed valve or more, the inner circumferential lip element 23c is bent and the gap is produced between the inside lip element 23c and the seal member 24b, thereby air flows into the tank and the negative pressure state within the tank is eliminated.

Consequently, the coil spring (biasing means) for the inner circumferential lip element 23c and the valve plate are obviated, and corresponding to this the part number may be decreased and the manufacturing cost may be reduced thereby the fuel cap can be manufactured at low charge.

Also, in the first embodiment, a thin portion 23i is formed at the joint portion of the inside arm portion 23b of the valve body 23 thereby the inside arm section 23b is liable to be bent downward. Consequently, it can react sharply to the negative pressure state within the tank.

Further in the cap 21 of the first embodiment, an annular projection 24f is formed at lower side of the outside plate 24d of the valve support plate 24, and at non-pressed state of the outer circumferential lip element 23e to the annular projection 22b, the gap is produced between the upper surface of the outer circumferential lip element 23e and the valve support plate 24. The outer circumferential lip element 23e is liable to be bent upward according to this gap, and even if the surface precision (undulation precision) of the seal surface is not sufficient in the annular projection 22b to which the outer circumferential lip element 23e is pressed, error in the surface precision of the seal surface can be absorbed by the gap. Consequently, manufacture of the upper surface of the annular projection 22b of the cap body 22 becomes easy.

Figure 11:
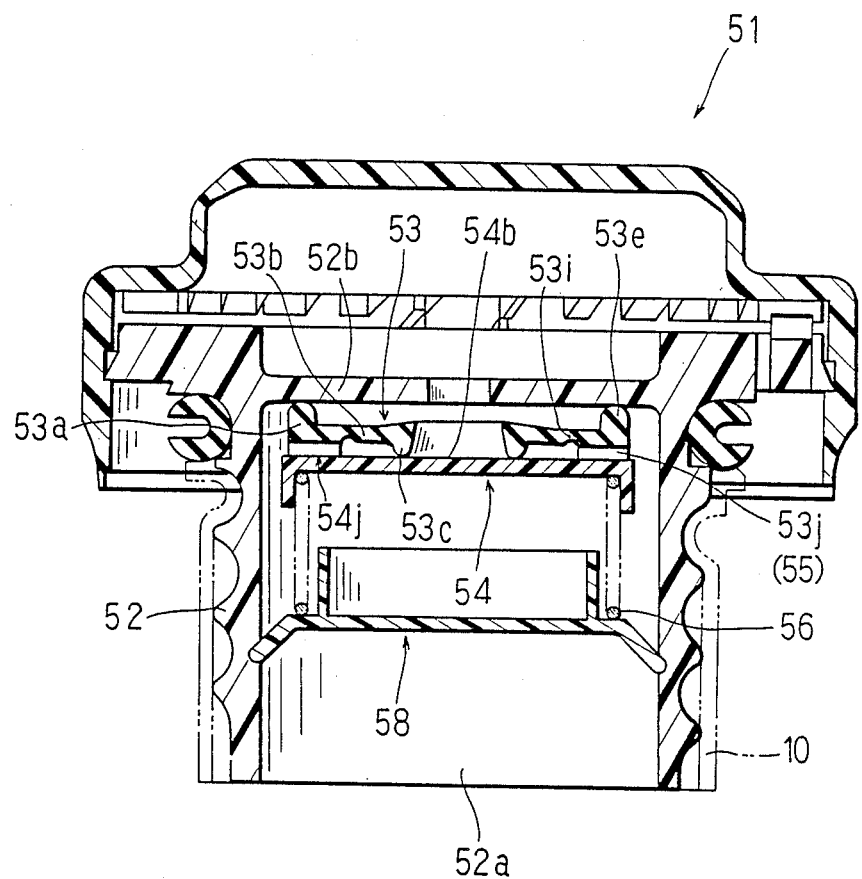
FIG. 11 is a sectional view of a fuel cap as a secoond embodiment.

Although in the cap 21 of the first embodiment, the inner circumferential lip element 23c of the valve body 23 acts at the negative pressure state and the outer circumferential lip element 23e acts at the positive pressure, state, another construction may be taken as in a cap 51 of a second embodiment shown in FIG. 11 where an outer circumferential lip element 53e acts at the negative pressure state and an inner circumferential lip element 53c acts at the positive pressure state.

In the second embodiment, the inner circumferential lip element 53c projecting downward is formed at inner circumferential edge of an inside arm member 53b of a base member 53a in a valve body 53, and the other circumferential lip element 53e projecting upward is formed at the outer circumferential edge thereof. The inner circumferential lip element 53c is provided at the inner ciecumferential edge of the inside arm member 53b of the base member 53a, and the outer circumferential lip element 53e is provided at upper side of the base member 53a. A thin portion 53i is formed at joint position of the inside arm member 53b. Also a recess 53j partially notched is formed at lower side of the base member 53a being rear side of the outer circumferential lip element 53e.

The valve body 53 is fixed to an upper surface 54j (support position) at circumferential edge portion of a disp-shaped valve support plate 54 by bonding the base member 53a being rear side of the outer circumferential lip element 53e, and the notched portion 53j at lower side of the base member 53a becomes a communication hole 55. Then the inner circumferential lip element 53c of the valve body 53 is pressed against the upper surface (seal member 54b) at inside from the communicating hole 55 of the valve support plate 54.

The valve body 53 and the valve support plate 54 are biased upward by a coil spring 56 with lower end held to a spring shoe plate 58, and the outer circumferential lip element 53e of the valve body 53 is pressed against the lower surface of the annular projection 52b and assembled to the fluid flow path 52a of the cap body 52.

In the cap 51 at normal state, the outer circumferential lip element 53e is pressed against the lower surface of the annular projection 52b by the coil spring 56 through the valve support plate 54. Also the inner circumferential lip element 53c is pressed against the seal member 54b of the valve support plate 54. Consequently the fluid flow path 52a is closed by the valve body 53 and the valve support plate 54.

When the pressure within the tank becomes negative pressure of prescribed valve or more, the outer circumferential lip element 53e is moved downward together with the valve support plate 54 against the biasing force of the coil spring 56, and separated from the lower surface of the annular projection 52b of the cap body 52. Consequently, according the gap between the outer circumferential lip element 53e and the annular projection 52b, fluid such as air flow from the outside of the cap 51 into the tank thereby the negative pressure state within the tank is eliminated.

Also when the pressure within the tank becomes positive pressure of prescribed valve or more, the inner circumferential lip element 53c is bent upward against the elasticity of the valve body 53, and separated from the seal memeber 54b of the valve support plate 54 thereby the gap is produced. Consequently fluid passes through the gap and flows out of the tank thereby the positive pressure state within the tank is eliminated.

Consequently, in the second embodiment, even if means for biasing the inner circumferential lip element 53c is not installed, the pressure within the tank can be asjusted thereby similar effects to the first embodiment can be obtained.

What is claimed is:

1. A fuel cap comprising:
   (a) a cap body to be installed to a filler neck of a fuel tank and provided with a fluid flow path and with an annular projection projecting inward at an inner circumference of said fluid flow path;
   (b) an annular valve body made of a rubber-like elastic material and provided with an outer circumferential lip element projecting from an outer circumferential edge thereof and pressed against said annular projection, with an inner circumferential lip element projecting from an inner circumferential edge thereof in reverse direction to said outer circumferential lip element, with a base portion arranged and held between said inner and outer circumferential lip elements, and with an inside arm member connecting said base portion and said inner circumferential lip element, said base portion being cylindrical, located at an intermediate position in radial direction between said inner and outer lip elements and having an annular recess in the upper side of the outer circumference thereof, said inside arm member extending from the upper side of said base portion inward in radial direction and having said inner circumferential lip element projecting upward and formed at the inner circumferential edge of said body;
   (c) an outside arm member extending from the lower side of said base portion outward in radial direction and having said outer circumferential lip element projecting downward and formed at the other circumferential edge of said body;
   (d) a disk-shaped valve support plate disposed at the rear side of said outer circumferential lip element and provided with a support portion for supporting said base portion of said valve body and with a seal member for pressing against said inner circumferential lip element when said valve body is supported, said valve support plate being spaced from said inside arm member to form a gap therebetween;
   (e) communication means extending through said support plate radially outward of the portion of said seal member pressed against said inner circumferential lip element for communicating that side of said valve body from which said outer lip element projects with the opposite side of said valve support plate when said inner circumferential lip element is separated from said seal member, said plate having a disk-shaped inside plate and an annular outside plate connected to said inside plate through a plurality of coupling members extending from the outer circumferential edge of said inside plate and having L-like cross-sections to provide a gap between said inside plate and said outside plate to form said communication means, and said recess in said base portion being engaged with the inner circumferential edge of said outside plate when said valve body is assembled with said valve suport plate;
   (f) means for biasing said valve support plate that said outer circumferential lip element is pressed against said annular projection; and
   (g) movement restriction means disposed in said gap between said inside arm member and said valve support plate for restricting movement of said inside arm member towards said valve support plate.

2. A fuel cap as set forth in claim 1, wherein a thin portion is formed in the inside arm member where it connects with the base portion.

3. A fuel cap as set forth in claim 1, wherein said movement restriction means is a projection extending from said valve support plate towards the inside arm.

* * * * *